United States Patent [19]
Gell et al.

[11] 3,777,040
[45] Dec. 4, 1973

[54] PROTECTION OF GLASS MELTING FURNACE ELECTRODE

[75] Inventors: Philip Anthony Maunsell Gell, Staffs, England; Frederick Maynard Merritt; William Richards Steitz, both of Toledo, Ohio

[73] Assignees: Toledo Engineering Co., Inc., Toledo, Ohio; Elemelt Limited, Kingswinford, Brierley Hill, Staffs, England

[22] Filed: Apr. 25, 1973

[21] Appl. No.: 354,505

[52] U.S. Cl. .................................................. 13/6
[51] Int. Cl. ............................................ C03b 5/02
[58] Field of Search ........................................ 13/6

[56] References Cited
UNITED STATES PATENTS

| 3,341,648 | 9/1967 | Molstedt et al. | 13/6 X |
| 3,391,236 | 7/1968 | Blumenfeld | 13/6 |
| 3,634,588 | 1/1972 | Steitz et al. | 13/6 |

*Primary Examiner*—Roy N. Envall, Jr.
*Attorney*—Hugh Adam Kirk

[57] ABSTRACT

An oxidizable electrode such as molybdenum projecting vertically through a shouldered aperture in the ceramic of the bottom of an electric glass melting furnace being surrounded in said aperture below said shoulder by a water jacket, above said shoulder by a corrosion resisting metal sleeve containing high content of nickel which sleeve has an outwardly extending flange adjacent said shoulder, a refractory gasket on each side of said flange sealing said flange to said shoulder and the upper end of said water jacket, and providing a coating or layer of refractory material, such as of alumina-silica fiber or cement and/or sodium silicate, at least on the outside of said sleeve and preferably on both sides thereof, and purging the space between the electrode and said jacket and lower portion of said sleeve with an inert gas.

22 Claims, 3 Drawing Figures

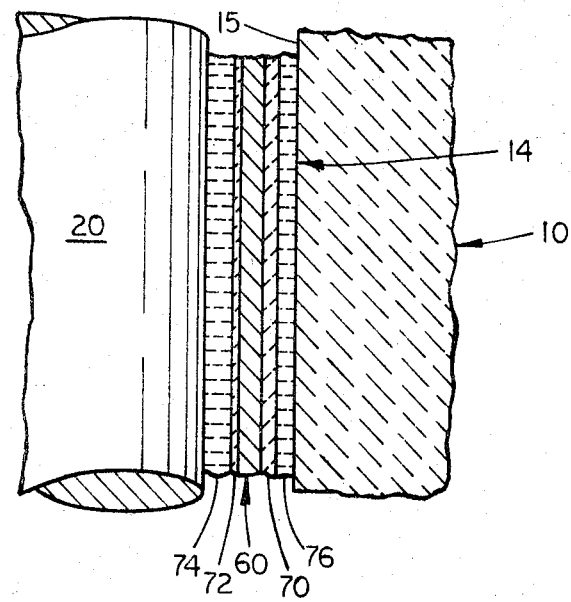
FIG. II
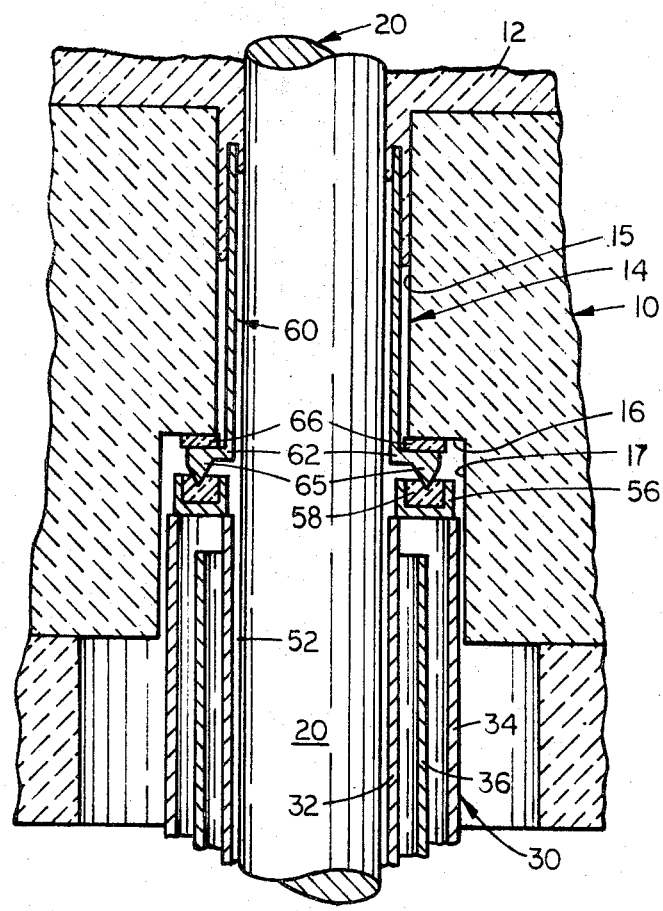
FIG. III 3,777,040

PROTECTION OF GLASS MELTING FURNACE ELECTRODE

BACKGROUND OF THE INVENTION

No material which is entirely satisfactory for the formation of electrodes for a glass melting furnace is at present available. The generally preferred material is molybdenum, but this material suffers from the disadvantage that it is readily oxidized by elemental oxygen at temperatures commonly occurring in a glass furnace, namely above about 500°C. Accordingly, all parts of an electrode formed of molybdenum, which during operation of the furnace, reach a temperature at which destructive oxidation occurs, must be protected from elemental oxygen.

By the term "destructive oxidation" we mean oxidation to an extent such that the ability of the electrode to function properly is impaired owing to change in the chemical nature of the material of which the electrode is formed, and possibly to change in the physical form of the electrode, for example partial disintegration or loss of material from the electrode.

When an electrode of this kind is in use, the current communication portion is protected from oxygen by a body of molten glass in which electrical current is conducted by the electrode. The stem portion of the electrode is arranged to project through an opening formed in the refractory wall of the furnace so that the necessary electrical connections can be established with the electrode outside of the furnace chamber. Generally, that part of the furnace wall and which is nearest the interior of the furnace is protected by glass present in the opening and surrounding the stem, such glass being molten near to the interior of the furnace and solid near the exterior thereof.

This known arrangement for protecting the stem of an electrode of the kind specified to prevent destructive oxidation thereof is not fully effective. The wall of the furnace is normally formed of a refractory material which is somewhat porous, oxygen can diffuse through the refractory material to the opening or aperture through which the stem extends, the stem being attacked by such oxygen. In the case of electrodes formed of molybdenum, molybdenum oxide formed by oxidation diffuses into the refractory wall of the furnace and in this way material is removed from the stem portion of the electrode thereby reducing the effective cross-sectional dimensions thereof eventually to an extent such that mechanical failure can occur.

The part of the electrode which extends outside the furnace of course can normally be held below the temperature by means of blast or air and/or water jacket.

Therefore it is an object of the present invention to provide an electrode of the kind specified whereof the stem has a protective covering which reduces or eliminates oxidation of the stem in use, namely that portion of which extends through the bottom wall of the furnace which raises to a temperature above about 500°C.

SUMMARY OF THE INVENTION

Generally speaking this invention relates to a means for protecting an oxidizable electrode for use in a glass melting furnace formed at least partly of a material which is subject to destructive oxidation under conditions commonly occuring in such furnace or at least in the wall thereof, and having a working portion which in use is emersed in the body of molten glass and from the surface of which electrical current flows directly into the body of molten glass, and a stem portion along which current is conducted to the working portion. The working portion may be a head of enlarged cross-sectional dimensions relatively to the stem portion, or it may be an extension or contunuation of the stem portion, and usually is cylindrical or circular in cross-section.

The invention relates to means for protecting this electrode particularly in the section between the inside and outside of the furnace by means of a water jacket, a protective sleeve, and an inert gas envelope. The protective sleeve is made of a high resistant metal such as stainless steel, a steel containing a high nickel content or metallic nickel, which sleeve is resistant to oxidation at the temperatures between about 1,000°C. that are attained at the electrodes during melting of glass in the furnace. This sleeve is also coated at least on the outside wall thereof, and usually both inside and outside walls thereof, with a layer of refractory material which may comprise a paper sheet of alumina-silica fibers sold under the trandename "Fiberfrax," a cement composed of this material, and/or a coating of sodium silicate commonly known as "water glass."

This electrode projects through an aperture in the bottom refractory wall of the glass melting furnace, which aperture has one diameter at its inner end and the larger diameter at its outer end forming a shoulder or step portion between its inner and outer walls, usually about mid-way therebetween. The metallic sleeve of this invention surrounds the electrode in the narrow diameter portion and is provided with an outwardly projecting annular flange adjacent to the shoulder or step portion. Both sides of this flange are provided with refractory gaskets, such as of asbestos, to seal this with the shoulder portion or the furnace wall and also with the upper end of a water jacket which surrounds the electrode in the larger diameter portion of the aperture. This flange also may be provided with a depending annular rib to form a partable seal that fits into a channel containing the gasket material at the upper or inner end of water jacket. Thus the water jacket may be removed and/or replaced while the sleeve remains in the aperture. These sealing gaskets on both sides of this flange help retain the inert gas purged inside the jacket and around the outside of the electrode in the aperture of the furnace wall. The lower end of the water jacket also is preferably provided with a seal or gasket between it and the electrode to retain the inert gas, at which location there may be provided the connection for the introduction of this inert gas to purge continuously this annular cylindrical space adjacent the electrode.

The water jacket may be provided with longitudinal baffle so that the water that is introduced at the lower outer end thereof will travel to the upper inner end of the jacket before being withdrawn at its lower end to insure good circulation throughout its length. Furthermore, a blast of air may be applied outside of the furnace against the water jacket and refractory surrounding the electrode for further cooling.

Thus by utilizing the combination of the solid state sleeve element in addition to the water jacket and inert gas, and an insulation layer or coating on the sleeve, the solid state material of the sleeve element is itself sealed as regards any permeability which it might otherwise present. Further the layer or coating on the sleeve may be of plastic consistency and perform a protective function by virtue of the fact that it acts as a lubricant to some extent, and, therefore, prevents disruption of the solid state thin-walled or sheet material of the sleeve element by virtue of frictional or abrading engagement which might otherwise occur between the sleeve element and either the stem portion of the electrode or the inner surface of the opening or aperture in the refractory furnace wall through which the electrode stem projects.

BRIEF DESCRIPTION OF THE SLEEVE

The above mentioned and other features, objects and advantages, and a manner of obtaining them are described more specifically below by reference to embodiments of this invention shown in the accompanying drawings, wherein:

FIG. I is a vertical section of an electrode projecting through the bottom wall of a glass melting furnace, with parts broken away, and showing the protecting means for the electrode according to one embodiment of this invention;

FIG. II is an enlarged sectional view of a portion of the protective sleeve and coatings that may be used between the sleeve and the electrode on one side thereof, and the aperture in the refractory wall of the furnace on the other side thereof;

FIG. III is a partial sectional view, similar to the upper portion of FIG. I of another embodiment of a partable gasket and seal between the flange of the sleeve and the water jacket around the electrode.

DETAILED DESCRIPTION OF PREFERRED EMBODIMENTS

Figure 1:
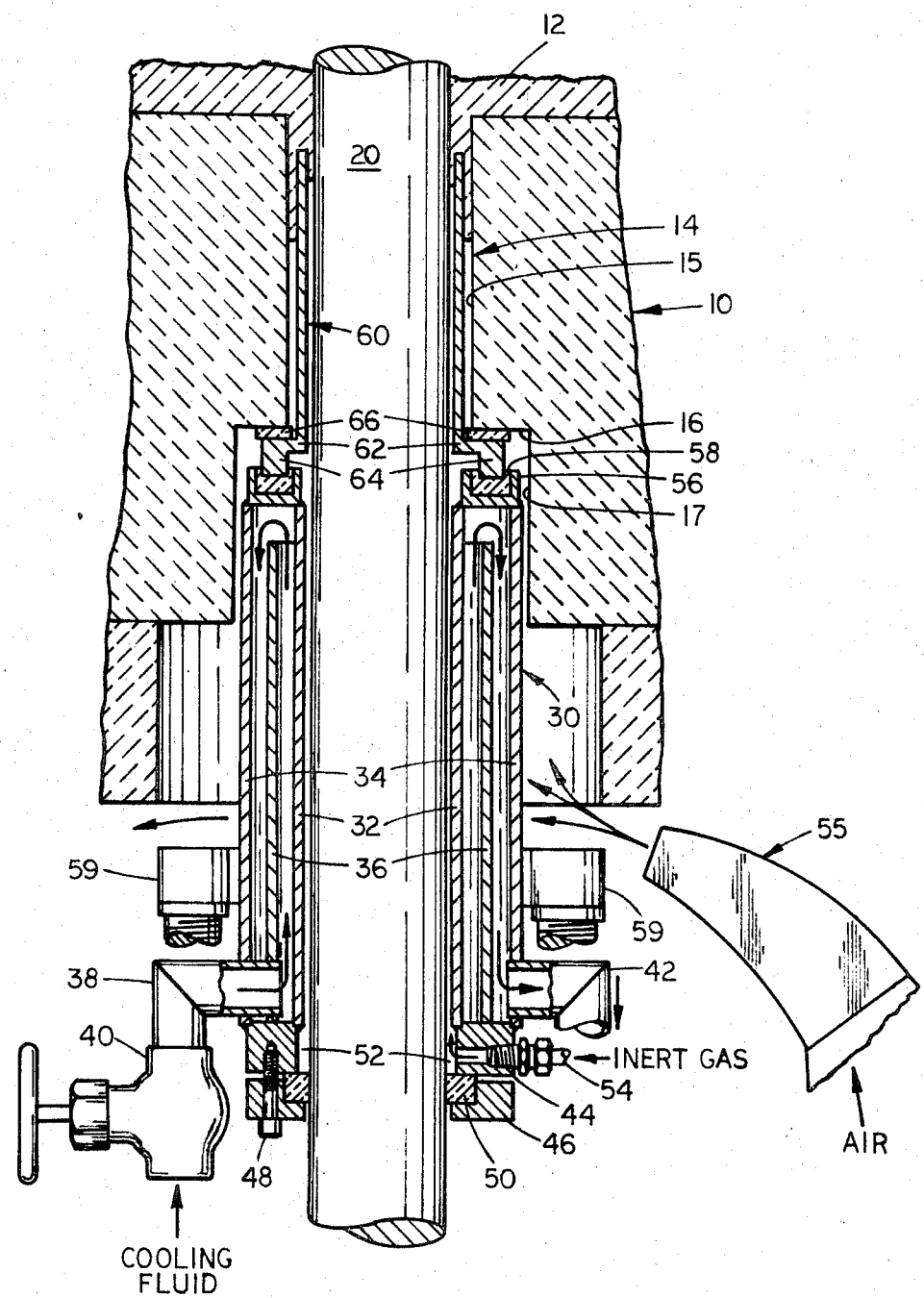

In the figures, the bottom refractory wall 10 of a glass melting furnace is shown with molten glass 12 resting on the top surface thereof and having in said wall a stepped opening or aperture 14 having an upper or inner smaller diameter hole 15 and a step or shoulder portion 16 to a lower or outer larger diameter hole or counterbore portion 17.

Projecting axially into this hole 14 is the oxidizable electrode 20, such as molybdenum, which may be supported at its bottom outer lower end by a jack (not shown) for longitudinal movement thereof, such as feeding it into the furnace as it may erode. Although this electrode is shown to have a cylindrical or rod shape it may have other than a circular cross-section, and may be provided with a larger upper end inside of the furnace in the molten glass 12.

Surrounding the electrode 20 and inside the larger diameter portion 17 of the aperture 14, there is shown a hollow sleeve or water jacket 30 which may comprise a pair of spaced concentric cylindrical tubular inner and outer walls 32 and 34, respectively, between which may be provided a cylindrical tubular baffle 36, so that cooling fluid, such as water, introduced into the inlet duct 38 and controlled by a valve 40 flows up and around one side of the jacket 30 and then over the top end of the baffle 36 and back down the other side to the outlet duct 42. The lower or outer end of this jacket may be sealed by an annular member ring 44 to which may be bolted a second ring 46 by means of bolts 48 for compressing a gasket 50 to seal the lower end of the jacket 30 to the outer wall of the electrode 20. This seals off the space 52 between the inside of the jacket 30 or its inner wall 32 and the outside of the electrode 20, which space 52 is continuously purged with or maintained in an inert atmosphere, such as nitrogen, which gas may be introduced into this space 52 through a duct and hose 54 connected to a radial hole in the lower ring 44. Furthermore, the lower outer end of the jacket 30 and the refractory wall 10 adjacent thereto may be further cooled by a blast of air from one or more ducts or nozzles 55.

The upper end of the jacket 30 may be closed by annular upwardly open channel 56, the bottom of which channel is welded to the upper end of the sides 32 and 34 of the jacket. Inside this channel 56 is a refractory gasket 58, such as of asbestos, which is sufficiently flexible to form a fluid tight seal with the lower end of the sleeve 60, but yet also be partable therefrom when the jacket 30 is lowered or removed from the aperture 14 by its support in brackets 59 shown below the wall 10 outside the furnace and welded or integally connected to the outer wall 34 of the jacket 30.

Above the jacket 30 and in the smaller diameter portion 15 of the opening 14 in the refractory bottom wall 10 of the furnace, is the sleeve 60 which is made of relatively thin metal of high nickel content, such as "Inconel 600" stainless steel. Its lower end has an outwardly extending flange 62 adjacent the shoulder 16, which flange may have a downwardly depending annular rib 64 as shown in FIG. 1, that may have a rectangular radial cross-section, or as shown in FIG. III a rib 65 of V-shaped or a triangular radial cross-section. The lower or outer edge of the rib 64 or 65 is forced into the upper surface of a gasket 58 in the annular channel 56. Between the upper face of the flange 62 and the shoulder 16, there provided another gasket 66, also of a refractory material such as asbestos, which may be similar to the gasket 58. Thus the sleeve 60 is sealed at the shoulder 16 both to the furnace wall 10 and also to the top end of the jacket 30.

Referring now to FIG. II, there is shown an enlarged section of the sleeve 60 which is further protected by having a layer 70 of refractory material at least on the outside thereof, herein shown to comprise a synethic asbestos type paper made of about 50 percent each of alumina-silica sold under the trademark "Fiberfrax," which layer 70 is wrapped around the outside of the sleeve 60 throughout its entire length, and also may be impregnated with a cement or paste of the same alumina-silica composition that also may be painted on the outside of the sleeve 60. This same alumina-silica material may also be painted on the inside of the sleeve 60 to form another layer 72 in order to protect both sides of the sleeve 60. Furthermore, there may be provided an additional sealing refractory layer 74 that acts also as a lubricant for the assembly of the electrode 20 and sleeve 60 into the opening 14, namely a layer or coating of sodium silicate or water glass, which may fill the space between the inside of the sleeve 60 and the outside of the electrode 20. This sodium silicate also may be painted on the outside of the paper layer 70 as an additional layer 76. Thus the sleeve 60 not only contains the metal portion but also a coating at least on the outside thereof of an alumina-silica composition which may be in a form of a wrapping paper or fibers and/or a cement, and/or the sleeve may be further coated with sodium silicate. Since these layers 70, 72, 74 and 76 are relatively thin, they have been exaggerated in thickness in FIG. II for the purpose of this description, and have been omitted entirely from the showing in FIGS. I and III.

In FIGS. I and III however, the molten glass 12 is shown filling part of the space at the upper or inner end of the sleeve 60 between it and electrode 20 and the aperture 14. The glass fills the spaces down to a point where it becomes solidified and thus seals the electrode 20, and the sleeve 60 in the upper end of the aperture 14 as well as sealing the upper end of the space 52 containing the inert gas.

While there is described above the principles of this invention in connection with specific apparatus, it is to be clearly understood that this description is made only by way of example and not as a limitation to the scope of this invention.

We claim:

1. In an electric glass melting furnace having electrodes extending vertically through apertures in a refractory wall of said furnace, means for protecting each of said electrodes from oxidation comprising:
   A. a fluid cooled jacket around said electrode extending partly into said aperture from the outside of said furnace,
   B. a high temperature oxidation resisting metal sleeve around said electrode inside said aperture adjacent longitudinally spaced from and adjacent to said jacket,
   C. a refractory gasket between said sleeve and said jacket, and
   D. a refractory layer around at least the outside of said sleeve.

2. An electrode protecting means according to claim 1 wherein said electrode is composed of molybdenum.

3. An electrode protecting means according to claim 1 wherein said electrode is cylindrical and so is said aperture in said furnace wall.

4. An electrode protecting means according to claim 1 wherein the fluid circulated in said jacket is water.

5. An electrode protecting means according to claim 1 wherein said jacket comprises a pair of concentric cylindrical walls with a cylindrical baffle between them for directing the circulation of fluid from one wall to the other.

6. An electrode protecting means according to claim 1 including means for maintaining an inert gas in the space around said electrode inside said jacket and said sleeve.

7. An electrode protecting means according to claim 1 wherein said inert gas is nitrogen.

8. An electrode protecting means according to claim 1 wherein said metal sleeve contains nickel.

9. An electrode protecting means according to claim 1 wherein said sleeve is composed of stainless steel.

10. An electrode protecting means according to claim 1 wherein said aperture is shouldered outwardly and said sleeve has an outwardly extending flange at one end thereof adjacent said shoulder.

11. An electrode protecting means according to claim 10 including a second gasket between said flange and said shoulder.

12. An electrode protecting means according to claim 11 wherein at least one of said refractory gaskets is composed of asbestos.

13. An electrode protecting means according to claim 10 wherein said gasket is between said flange and the adjacent end of said jacket.

14. An electrode protecting means according to claim 10 wherein said jacket comprises an annular channel at said adjacent end for seating said gasket.

15. An electrode protecting means according to claim 10 wherein said flange on said sleeve includes an annular rib extending outwardly from said flange toward said jacket.

16. An electrode protecting means according to claim 15 wherein the radial cross-section of said rib is rectangular.

17. An electrode protecting means according to claim 15 wherein the radial cross-section of said rib is triangular.

18. An electrode protecting means according to claim 1 wherein said refractory layer comprises alumina-silica fibers in form of a paper wrapped around the outside of said sleeve.

19. An electrode protecting means according to claim 1 wherein said refractory layer comprises an alumina-silica cement coated on said sleeve.

20. An electrode protecting means according to claim 1 wherein said refractory layer includes an alumina-silica cement coated on the inside of said sleeve.

21. An electrode protecting means according to claim 1 wherein said refractory layer comprises sodium silicate coated over both the inside and outside of said sleeve to act as a sealer and a lubricant for the assembly of said sleeve and electrode in said aperture.

22. An electrode for an electric glass melting furnace having a refractory bottom wall with an outwardly extending shouldered aperture therein for said electrode, the improvement being in the means for surrounding said electrode in said aperture, said means comprising:
   A. a high temperature oxidation resistant metallic sleeve between said electrode and said refractory wall in the smaller diameter portion of said aperture, said sleeve having a radially outwardly extending end flange adjacent said shoulder,
   B. a refractory layer on at least one side of said sleeve,
   C. a fluid cooled jacket between said electrode and said refractory wall in the larger diameter portion of said aperture,
   D. a refractory gasket between said flange and the adjacent end of said jacket, and
   E. means for maintaining an inert gas in the space between said electrode and sleeve and said jacket.

* * * * *

PO-1050
(5/69)

UNITED STATES PATENT OFFICE
CERTIFICATE OF CORRECTION

Patent No. 3,777,040                  Dated December 4, 1973

Inventor(s) Philip Anthony Maunell GELL et al

It is certified that error appears in the above-identified patent and that said Letters Patent are hereby corrected as shown below:

Column 1, line 53, change "or" (first occurrence to - - of - - . Column 2, line 6, change "contunuation" to - - continuation --; and line 36, change "or" to - - of - - . Column 4, line 18, change "integally" to - - integrally - - ; line 34, after "there" insert - - is - - ; and line 42, change "synethic" to - - snythetic - - . Column 5, line 25, cancel "adjacent". Column 6, line 37 after "and" insert - - said - -

Signed and sealed this 7th day of May 1974.

(SEAL)
Attest:

EDWARD M.FLETCHER,JR.
Attesting Officer

C. MARSHALL DANN
Commissioner of Patents